Patented Sept. 2, 1941

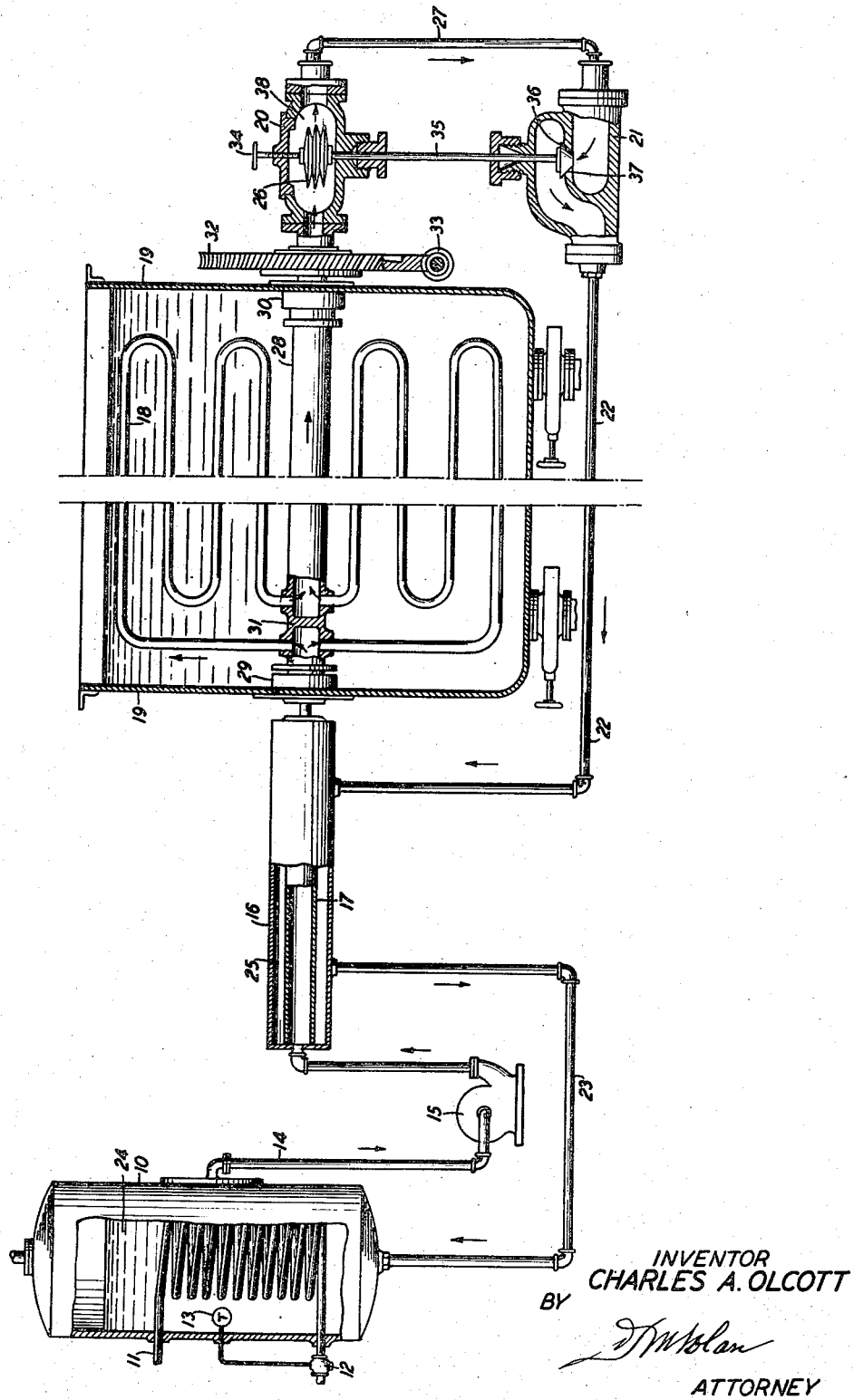

2,254,386

UNITED STATES PATENT OFFICE 2,254,386

MEANS FOR TREATING SUGAR BEARING MATERIALS

Charles A. Olcott, West Milford, N. J.

Application October 24, 1938, Serial No. 236,659

15 Claims. (Cl. 127—17)

This invention relates to the temperature conditioning of materials and more particularly to a method and means of treating sugar-bearing materials.

An object of this invention is to obtain a limited temperature change uniformly throughout a mass of material.

Another object of this invention is to heat a mass rapidly when the temperature of the mass is considerably below a desired temperature, to heat the mass more slowly when the mass approaches the desired temperature, and to prevent overheating when the mass attains the desired temperature.

A more particular object of this invention is to decrease the viscosity of sugar-bearing materials prior to the extraction of the sugar therefrom without the danger of substantially reducing the yield or materially affecting the purity of the product.

Another more particular object of this invention is to impart heat to the mass of magma or other sugar-bearing material prior to the extraction of the sugar therefrom quickly when a considerable differential in temperature exists between the temperature of the magma and the temperature at which it is desired to introduce the magma into the centrifugal, to supply heat more slowly when the temperature of the magma approaches that desired, and to prevent the overheating of the magma when the desired temperature is attained.

These and other objects are attained by varying the temperature differential that exists between the material to be temperature conditioned and the surface of a heater or other heat exchanger in contact with the material, in controlled relation to the temperature of the material; and more particularly by so varying the temperature differential that it is reduced as the material approaches or reaches the temperature it is desired that it shall ultimately attain.

Although the broader aspects of the invention and the variety of its possible applications will be apparent to those skilled in the pertinent arts, henceforward I shall confine this exposition to a description of a preferred illustrative embodiment of the invention in its relation and application to the refining of sugar, and more particularly to that step of heating the sugar magma or massecuite which precedes centrifuging.

In the manufacture of sugar, the magma or massecuite is heated in a mixer or mingler just prior to separation of the sugar in a centrifugal machine. Modern practice dictates that the temperature of the magma be as high as possible in the extraction process without appreciable quantity of the sugar crystals dissolving, or decomposition or caramelization of sugar occurring. A temperature of approximately 140° F. has been almost universally accepted as the optimum in the industry for this purpose. Further, it is essential for efficient operation that the magma be introduced into the centrifugal at a uniform temperature. Frequently the magma is rapidly introduced into the mixer and removed rapidly therefrom and the heating means must be sufficient to heat the magma to the desired temperature before it flows to the centrifugal. Again, in the course of the treatment, due to the stoppage of the centrifugals or other reason, the magma remains in the mixer or mingler for a period longer than that for which the heating means was designed to function. As a result, if the heat energy is continually supplied to the magma, the temperature of the magma increases to that at which the sugar crystals are redissolved.

It is a feature of the present invention that a material such as magma or other sugar-bearing material can be quickly and efficiently heated to a uniform predetermined temperature regardless of the period of storage in its mixer or of other variable factors encountered in the refining process.

In systems heretofore employed, a revolving coil through which hot water maintained at a uniform temperature is circulated at a uniform rate supplied heat to the magma or massecuite contained in the mixer or mingler. In such systems an increase in the temperature of the magma caused a smaller differential between its temperature and that of the hot water with the consequential rate at which heat transferred from the water to the magma. The consequent increase in the temperature of the water raised the temperature of the coils to cause a further increase in the temperature of the magma. In other words, as the temperature of the magma approached or reached the desired level and very little heat was needed from the coils, the temperature of the coils nevertheless tended to increase and therefore to endanger the magma. To insure that the magma attained the maximum temperature for obtaining the lowest viscosity commensurate with efficient and economical operation of the centrifugal machines and without appreciable decomposition or solution of the sugar crystals, such systems required that either a definite time interval be determined for heating or the temperature be constantly ascertained to withdraw the supply of heat when the desired temperature was reached. If the centrifugal operation were slowed down or for any other reason the magma remained in the mixer or mingler longer than that ordinarily expected, these systems severely hampered securing the largest possible yield of sugar from sugar-bearing materials.

In the copending application of applicant, Serial No. 160,178, filed on August 20, 1937, which issued on November 7, 1939 as United States Patent No. 2,178,805, a method and apparatus are disclosed in which the magma or other material is heated to a predetermined temperature and maintained at that temperature by controlling the supply of a fluid medium such as water which is passed through coils in heat exchange relation with the magma. More specifically, the control so operates that as the magma approaches the desired temperature the rate of circulation of the heating fluid is reduced, with a resulting increase in the rate at which heat power is transferred from each unit volume of heating fluid to the magma, so that the objectionable tendency for the coil temperature to rise to a dangerous level as described above is obviated. A further improvement in the system disclosed in the copending application can be realized by incorporating a feature of the invention involving regulation of the temperature of the fluid medium supplied to the coils or other heating means in heat exchange relation with the magma.

In the systems of the prior art, the temperature of the surfaces of the heating coils, which were in heat exchange relation with the magma in the mixer, remained substantially the same, regardless of the temperature of the magma. The differential in temperature between that of the heating surfaces and that of the magma decreased, to be sure, as the temperature of the magma was raised, but the temperature of the magma, due to the relatively long time required for the heating process, tended to approximate that of the heating surface with the consequential danger of the decomposition of the sugar. To avoid this latter danger, it was necessary that the temperature differential between the heating surfaces and the magma be initially low.

In accordance with the method and apparatus of the invention, the temperature differential between the heating surface and the magma may be relatively high when the cold magma is initially fed into the mixer, so that the heating takes place rapidly. Thereafter, as the temperature of the magma is raised the temperature of the heating surface and therefore also the temperature differential is automatically and progressively adjusted to lower values, until finally only enough heat is supplied to maintain the magma at the desired ultimate temperature. As a consequence, it is possible to decrease greatly the time or the amount of apparatus required for the heat treatment operation and at the same time insure against the deleterious effects of excessive magma temperature. For example, in the systems of the prior art the temperature of the coils should not be harmfully or materially higher than that of the desired final temperature of the magma. Ordinarily the temperature of the coils employed in the mixer could not exceed 160° F. If the temperature of the magma as introduced into the mixer were about 90° F., the temperature differential was approximately 70° F. in these systems. In accordance with this invention, initially the temperature of the coils may be approximately 200° F. and the temperature differential is as a consequence about 110° F. Since the rate of heating of a mass is roughly in proportion to the temperature differential, the rate of heating of the magma is increased over 50 per cent and the magma is conditioned for the centrifugals in a period of approximately 35 per cent less than that required by systems of the prior art. However, the protection against overheating is fully as effective as in systems of the prior art.

A more comprehensive understanding of this invention is obtained by reference to the accompanying drawing which shows the application of an illustrative embodiment of this invention to a mixer or hot mingler as used in the sugar industry.

In the drawing, a tank 10 is normally filled with water 24 or other fluid medium and the water is heated by a coil 11 or other source of heat. Steam passes to the coil 11 through a valve 12 controlled by a thermostatic bulb 13. The thermostatic bulb 13 controls in a well-known manner the valve 12 to insure that the temperature of the water contained in the tank 10 is maintained at approximately 210° F. Hot water is drawn through a conduit or pipe 14 by means of a pump 15 from the tank 10 and the water is driven by the pump 15 through a heat exchanger 16. The heat exchanger 16 preferably comprises an internal chamber 17 surrounded by a jacket 25. From the chamber 17 of the heat exchanger, the hot water passes through coils in the form of a stirrer 18 located in a mingler or mixer tank 19 in which the magma or other sugar-bearing material is contained. The stirring coils 18 may be similar to those used in the above-noted copending application of applicant.

The stirring coils 18 are fixedly connected to a hollow pipe 28 which is supported by two bearings 29 and 30. The pipe 28 serves as the connecting media for the passage of the hot water from the chamber 17 of the heat exchange unit to the coils 18 and from the coils 18 to the thermostatic device 20. A baffle or wall 31 may be employed to direct the water to the outer coils initially as shown in the above-noted copending application of applicant.

The shaft 28 is rotated by a worm wheel 32, and worm gear 33, driven by any suitable source of power. The thermostat device 20 may be of the bellows type comprising a metal gas-filled thermostatic bellows 26 which is adjusted by a manually operated wheel 34 passing through the chamber containing the bellows. A valve stem rod 35 is connected to a valve head 36. The expansion and contraction of the bellows 26 operates to raise and lower the valve head 36 to regulate the volumetric flow of the water through the system.

When the valve head is raised out of engagement with an associated valve seat 37, water flows through the system by means of a pipe 27 connecting the chamber 38 of thermostat 20 with valve 21. When the valve head 36 is closed against seat 37 the flow stops. The thermostatic device may have bellows 26 or other instrumentality which controls the valve 21 to regulate the volumetric flow of the hot water in the circulating system. From the valve 21 the water is led through a pipe 22 to the outer chamber or jacket 25 of the heat exchange device 16. The inner chamber is contained in the outer chamber 25 and the fluid medium in the outer chamber 25 is in heat exchange relation with the inner chamber 17. From the outer chamber 25 of the heat exchange unit the water is returned through a pipe 23 to the tank 10.

The heating surfaces of the inner chamber 17 of the heat exchange unit 16 are so proportioned and the capacity of the outer chamber 25 is so designed that in normal operation the hot water leaves the inner chamber 17 to pass to the stirring coils 18 at a temperature of about 200° F. The thermostatic bellows 26 of the thermostatic device 20 is adjusted so that the water at the outlet of the coils 18 is approximately 140° F. Accordingly, the temperature of the water entering the jacket 25 of the heat exchange device 16 from the valve 21 is at approximately 140° F. These temperature requirements are those desired for obtaining a temperature of approximately 140° F. in the magma. The temperature of the water leaving the jacket of the heat exchange device 16 to return to the tank 10 is roughly 150° F. in normal operation, since a portion of the heat energy from the water passing through the inner chamber 17 of the heat exchange device is transferred to the return water.

In the event that the magma in the tank 19 remains therein for a period longer than that for which the apparatus is adjusted, such for example, as the result of the stopping of the centrifugal machines, the rate at which heat energy must be supplied to the magma to maintain it at the desired temperature is substantially less than that required to effect rapid heating, for only as much heat is needed as will offset heat loss from the magma by radiation or otherwise. If nevertheless the water entering the coils 18 remained at the 200 degree temperature indicated above it is obvious that the magma temperature would further increase and the magma would be dangerously overheated. However, the higher the magma temperature the smaller is the temperature differential between the heating water and the magma, and the lower the rate at which heat is extracted from the water passing through the coils 18. In consequence of any reduction in the rate of extraction of heat from the latter the temperature of the water leaving the coils 18 tends to rise. In this situation the thermostat 20 operates the valve 21 in such direction as to increase the impedance presented to the circulation of water by the pump 15 and thereby to reduce the velocity of flow.

The reduction in the velocity of circulation of the heating fluid has important consequences. First, as explained in my copending application, supra, each unit volume of heating fluid remains longer in heat exchange relation with the magma, hence more heat is abstracted from it and it accordingly tends to leave the coils 18 at a lower temperature than before. A second consequence is that each unit volume of the heating fluid remains longer in the heat exchanger 16, hence the rate of heat exchange per unit volume of fluid is increased, the temperature of the fluid returned to the tank 10 is increased, and the temperature of the fluid supplied to the coils 18 is correspondingly reduced. This reduction of the inlet water temperature is precisely the effect desired for it means a reduced coil temperature and elimination of the danger of overheating the magma. The readjustment of the various significant temperatures following automatically on stoppage of the magma flow may be better understood on reference to the following typical example.

The hot water from the tank 10 which enters the inner chamber 17 of the heat exchange device 16 at approximately 210° F., remains in the inner chamber 17 and as a consequence, in heat exchange relation with the return water in the chamber for a relatively long period. The water entering the mixer coils 18 is at a temperature of about 155° to 160° F. while return water leaving the jacket of the heat exchange device 16 passing through the pipe 23 to the tank 10, increases to about 195° to 190° F. Since the water entering the mixing coils 18 is between 155° to 160° F., no overheating occurs to materially damage the magma contained in the tank 19. Further, the precipitated sugar crystals in the magma are not redissolved by increasing the temperature of the magma above 140° F. In this system both the flow and temperature of the hot water supplied to the heating coil are regulated in response to the temperature of the magma by means of the thermostat 20, valve 21, and heat exchange device 16. The temperature of the water supply and the flow of the medium through the coils 18 of the mixer vary inversely with the temperature of the magma.

No heat is lost in this system since the heat removed from the hot water by the heat exchange device is returned to the tank 10 and reduces the requirements for steam to maintain the water 24 in the tank 10 at the required temperature. The system and process is equally applicable to attaining a desired temperature in suger-bearing materials or other masses at a predetermined temperature in other devices. For example, magma or massecuite can be raised to a uniform temperature in a crystallizer employed in the processing of sugar. In addition, the process and apparatus in accordance with this invention may be used for reducing the temperature of a mass below the ambient and maintaining the mass at that desired temperature.

By the manufacture of sugar is meant the separation of sugar from the non-sugars which are associated with it in its natural state and isolating the sugar in a form sufficiently pure for commercial sale.

While a preferred embodiment of this invention has been illustrated and described, various modifications may be made therein without departing from the scope of the appended claims.

What is claimed is:

1. In a system for the manufacture of sugar, a tank for containing magma, a coil in said tank in heat exchange relation with said magma, means for supplying fluid medium to said coil to heat said magma to a desired temperature, a volumetric valve for controlling the withdrawal of the fluid medium from said coil, a thermostat, responsive to the temperature of the fluid medium withdrawn from said coil, for controlling said valve, and a heat exchanger, posterior to said thermostat through which and in which the heated medium to be supplied to said coil passes and is in heat exchanging relation with the fluid medium withdrawn from said coil for regulating the temperature of the fluid medium supplied to said coil.

2. In a temperature conditioning system, a container for the material to be temperature conditioned, a fluid passage in heat exchanging contact with the material in said container and having an inlet and an outlet, a reservoir for containing a fluid and means for maintaining the fluid in said reservoir at a substantially constant temperature, means for circulating said fluid from said reservoir to said inlet, through said passage, and from said outlet back to said reservoir in a closed system, a heat exchanger coupling the fluid entering said inlet and the fluid leaving said outlet in dry heat exchanging relation, and means varying the rate of heat exchange per unit of fluid entering said heat exchanger in the same sense as concomitant changes in the temperature of the material in said container.

3. A combination in accordance with claim 2 in which said rate varying means comprises means controlled by the temperature of the said fluid leaving said outlet.

4. A combination in accordance with claim 2 in which said rate varying means comprises means controlling the velocity of circulation of said fluid.

5. A combination in accordance with claim 2 in which said rate varying means comprises means varying the velocity of circulation of said fluid, in response to a change in the temperature of said fluid at said outlet, in such sense that an increase in said temperature occasions a decrease in said velocity.

6. A combination in accordance with claim 2 in which said rate varying means comprises means varying the velocity of circulation of said fluid in inverse relation to the temperature of said fluid at said outlet.

7. In a temperature conditioning system, a container for the material to be temperature conditioned, a fluid passage in heat exchanging contact with said material and having an inlet and an outlet, a reservoir containing a fluid, means maintaining the fluid in said reservoir at a substantially constant temperature, means for circulating only said fluid from said reservoir to said inlet, through said passage, and from said outlet back to said reservoir in a closed system, and means varying the temperature of said fluid at said inlet in inverse relation to changes in the temperature of said material.

8. A combination in accordance with claim 7 in which said temperature varying means is responsive to changes in the temperature of circulating fluid that has been in heat exchanging relation with said material.

9. A system for stirring and producing temperature modifying effects in the treatment of sugar bearing material comprising a receptacle for the material, a movable stirring device within said receptacle and having a passage therein for the circulation of a temperature controlling fluid, a reservoir for said fluid and means for controlling the temperature of the said fluid in the reservoir, means for circulating said fluid in a closed system from said reservoir, through said stirring device and back to said reservoir, means for bringing circulating fluid entering said stirring device and fluid leaving said device into heat exchanging relation, and means for varying the rate at which heat energy is exchanged in said last-mentioned means per unit volume of said circulating fluid entering said stirring device, said rate varying means being responsive to changes in the temperature of the material in said receptacle.

10. A system in accordance with claim 9 in which said rate varying means is operatively controlled by circulating fluid that has been in heat exchanging relation with said material in the receptacle.

11. In combination, a hot mingler for the heating of sugar magma or the like, said mingler including a passage for the circulation of heating fluid in heat exchanging relation with the magma, a device coupling the fluid entering said mingler and fluid leaving said mingler in dry heat exchanging relation, and control means for regulating the rate of heat exchange in said device per unit volume of circulating fluid entering said mingler.

12. In combination, a hot mingler for the heating of sugar magma or the like including a stirrer providing a passage for the flow of heating fluid, means coupling said fluid entering said stirrer and said fluid leaving said stirrer in heat exchanging relation, means for changing the rate of heat exchange in said coupling means per unit volume of circulating fluid traversing said stirrer under the control of circulating fluid that has been in heat exchange relation with said magma, said last-mentioned means operating in such sense as to tend to increase said rate of heat exchange in response to a rise in temperature of said magma.

13. A combination in accordance with claim 12 in which said last-mentioned means controls the volumetric rate of flow of said heating fluid through said stirrer.

14. In a system for the manufacture of sugar, a tank for containing sugar magma or the like, a fluid passage in heat exchange relation with the magma in said tank, means for circulating fluid through said passage, means for varying the volumetric rate of flow of said fluid through said passage under control of the temperature of the said fluid leaving said passage, and means for modifying the temperature of the said fluid entering said passage by heat exchange with the said fluid leaving said passage.

15. In combination, a hot mingler for the temperature conditioning and stirring of sugar magma or the like, said mingler comprising a receptacle for the magma and a stirring device within said receptacle comprising a fluid passage movable in heating contact with said magma, a heating fluid reservoir, means circulating heating fluid through said passage from said reservoir, means controlling the temperature of the said heating fluid in said reservoir, means responsive to and controlled by temperature variations in circulating fluid that has been in heat exchanging relation with said magma, and means controlled by said responsive means for varying the entrance temperature of the said fluid circulating to said passage in opposite sense to fluctuations in the temperature of said magma.

CHARLES A. OLCOTT.